United States Patent [19]
Ohno et al.

[11] Patent Number: 5,346,740
[45] Date of Patent: Sep. 13, 1994

[54] OPTICAL INFORMATION RECORDING MEDIUM

[75] Inventors: Eiji Ohno; Noboru Yamada; Kenichi Nagata; Kenichi Nishiuchi, all of Osaka; Nobuo Akahira, Yawata, all of Japan

[73] Assignee: Matsushita Electric Industrial Co., Ltd., Osaka, Japan

[21] Appl. No.: 765,514

[22] Filed: Sep. 25, 1991

[30] Foreign Application Priority Data

Sep. 25, 1990 [JP] Japan ................. 2-255829
Sep. 25, 1990 [JP] Japan ................. 2-255831
Sep. 25, 1990 [JP] Japan ................. 2-255832

[51] Int. Cl.$^5$ ............................................ B32B 3/02
[52] U.S. Cl. ............................ 428/64; 428/65;
428/411.1; 428/688; 428/913; 430/945; 346/76 L; 346/135.1; 369/275.2; 369/286
[58] Field of Search .......... 428/64, 65, 913, 411.1, 428/688; 430/270, 945; 369/283, 284, 275.2, 286; 346/76 L, 135.1

[56] References Cited

U.S. PATENT DOCUMENTS

| | | | |
|---|---|---|---|
| 4,954,379 | 9/1990 | Nishida et al. | 428/64 |
| 5,171,618 | 12/1992 | Suzuki | 428/64 |
| 5,206,114 | 4/1993 | Kobayashi | 430/270 |
| 5,234,737 | 8/1993 | Ueno et al. | 428/64 |

OTHER PUBLICATIONS

Ohta et al. SPIE vol. 1316, Optical Data Storage, p. 367 (1990).
Young et al., Journal of Applied Physics, vol. 60, p. 4319 (Dec. 1986).

Primary Examiner—Patrick J. Ryan
Assistant Examiner—Marie R. Macholl
Attorney, Agent, or Firm—Wenderoth, Lind & Ponack

[57] ABSTRACT

An optical information recording medium comprising a substrate, and a dielectric layer, a recording layer, a dielectric layer and a reflective layer which are laminated on the substrate in this order or a reflective layer, a dielectric layer, a recording layer and a dielectric layer which are laminated on the substrate in this order, wherein a state of the recording layer is reversibly changed between optically recognizable states by irradiation of, for example, a laser beam and the recording layer has a thickness of from 1 nm to 10 nm, which recording medium has improved recording sensitivity.

15 Claims, 8 Drawing Sheets

OPTICAL INFORMATION RECORDING MEDIUM

BACKGROUND OF THE INVENTION

1. Field of the Invention

The present invention relates to an optical information recording medium. More particularly, the present invention relates to an optical information recording medium which can record, reproduce or rewrite information at a high recording density and a high speed using an optical means such as a laser beam.

2. Description of the Related Art

A technique for recording and reproducing information at a high recording density on an optical disc using a laser beam and the like is known and applied to a document file, a still picture file or an external memory of a computer. A rewritable information recording system has been studied and developed. One example of such system is a phase-change optical disc, which records and erases signals using a reversible phase change in a recording layer between an amorphous state and a crystalline state of a compound or between one crystalline state and another crystalline state of a compound by the irradiation of a laser beam. As a recording material in which the reversible phase change occurs, an alloy of Te, Se, In or Sb is mainly used. When such alloy is heated and molten and then quenched, it becomes amorphous, and when the amorphous alloy is heated and kept at a temperature of its crystallization temperature or higher or molten and quenched, it is converted to the crystalline state. Since the reflectance is different between the amorphous state and the crystalline state, the information is reproduced by optically detecting such reflectance difference.

In general, the phase-change optical disc has a three-layer structure comprising a recording layer which is sandwiched by a pair of protective layers containing a dielectric material and laminated on a substrate or a four-layer structure comprising a reflective layer formed on the above three-layer structure.

In the three-layer structure, the recording layer usually has a thickness of 70 nm to 120 nm to increase the change of the reflectance between the crystalline state and the amorphous state. In the four-layer structure, the recording layer has a thickness of 20 nm to 50 nm to utilize an enhancing effect by the reflective layer and the dielectric material.

As a special structure of the recording medium, Japanese Patent Kokai Publication No. 187950/1985 discloses a structure comprising alternately laminated metal films each having a thickness of 2 to 20 nm and silicon oxide films each having a thickness of 1 to 40 nm to increase sensitivity of the recording medium and chemical stability. In this recording medium, various metals including $Sb_2Te_3$, Co, Pt and Te are exemplified as the material to be used as the recording layer. However, this Japanese Patent Kokai Publication does not suggest or limit a composition for rewritable recording.

One of characteristics required for the phase-change optical disc is a high recording-erasing sensitivity. This means that the signals can be recorded and erased with the irradiation of the laser beam having a low power and that a cost of the recording apparatus can be reduced. The phase change from the crystalline state to the amorphous state (in general, a signal recording step) requires the largest laser beam power in case of, for example, a medium in which the phase change is carried out between the amorphous state and the crystalline state, since the amorphous is generated by heating and melting the crystalline and then quenching it. However, in general, a material which is easily made amorphous is difficult to crystallize, so that the erasure of the signal is difficult. To overcome this drawback, a medium having a high crystallization sensitivity is used to achieve a necessary erasing sensitivity, while a laser beam with a large power is applied to record the signals. That is, in such case, a large power laser beam is required.

Another one of the characteristics required for the phase-change optical disc is thermal stability of the recorded signal, namely stability of the amorphous state. Even a material which is expected to change its phase between the amorphous state and the crystalline state may not be made amorphous by the irradiation of the laser beam on a thick film of the crystal or, if it is made amorphous, it may be readily crystallized. Such material cannot be used in the phase-change optical disc. This may be largely because the crystallization temperature of such material is around room temperature. This is the reason why the study has been concentrated on an alloy of Te having a composition near an eutectic composition, an alloy of Se, a composition of a Ge-containing compound and a composition in which the amorphous phase is stable even in case of a single recording layer. However, a compound having a stable amorphous phase is not necessarily excellent in other characteristics, and the number of materials which can be practically used as a recording medium is very small.

SUMMARY OF THE INVENTION

One object of the present invention is to provide an optical information recording medium which requires a small power for making an optically active layer amorphous, whereby the recording sensitivity is increased.

Another object of the present invention is to provide an optical information recording medium which has an improved thermal stability of recorded signals.

According to a first aspect of the present invention, there is provided an optical information recording medium comprising a substrate, and a dielectric layer, a recording layer, a dielectric layer and a reflective layer which are laminated on said substrate in this order or a reflective layer, a dielectric layer, a recording layer and a dielectric layer which are laminated on said substrate in this order, wherein the state of said recording layer is reversibly changed between optically recognizable states by irradiation of, for example, a laser beam and said recording layer has a thickness of from 1 nm to 10 nm.

According to a second aspect of the present invention, there is provided an optical information recording medium comprising a substrate, and a dielectric layer, a recording layer and a dielectric layer which are laminated on said substrate in this order, or a dielectric layer, a recording layer, a dielectric layer and a reflective layer which are laminated on said substrate in this order, or a reflective layer, a dielectric layer, a recording layer and a dielectric layer which are laminated on said substrate in this order, wherein said recording layer comprises alternately laminated at least two optically active layers the state of each of which is reversibly changed between optically recognizable states by irradiation of, for example, a laser beam and at least one amorphous-acceleration layer (a layer which accelerates reversible change of the states of the optically active layers) and each comprising a dielectric material, and each of said optically active layers has a thickness of from 1 nm to 10 nm.

Since the thickness of the optically active layer and the structure of the recording medium are limited, the power required for making the optically active layer amorphous is decreased, so that the recording sensitivity is increased.

Further, by specifying the material composition in the optically active layer, the recording medium is thermally stable through increase of the crystallization temperature so that the thermal stability of the recorded signals is improved, though, the amorphous state of the recording medium having the conventional structure is unstable at room temperature.

DETAILED DESCRIPTION OF THE DRAWINGS

In the phase-change optical disc, the recording sensitivity is an important factor for determining the power of a semiconductor laser which is required for a recording apparatus. Since the semiconductor laser having the larger power is more expensive, the increase of the sensitivity of the optical disc is essential to reduce the cost of the recording apparatus.

In case of the phase-change optical disc, the recording sensitivity is intended to mean the power required for changing the recording layer from the crystalline state to the amorphous state. To improve the recording sensitivity, the recording layer is made of a material which is easily made amorphous. However, many of materials which are easily made amorphous are difficult to crystallize. Namely, since a phase change from the amorphous state to the crystalline state requires a longer time, the signals are insufficiently erased so that a large number of unerased signals remain. Then, a material having a sufficiently high crystallization rate such as GeSeTe or InSbTe is used to improve the erasing characteristic, and the signals are recorded by irradiating the large power laser beam. This means that the poor recording sensitivity necessitates a larger power semiconductor laser so that the cost of the recording apparatus increases.

As a result of the extensive study on a development of a recording medium which has a good recording sensitivity even when a material having a high crystallization rate is used, it has been found that a structure comprising a recording layer having a specific thickness which is sandwiched by dielectric layers and also a reflective layer can increase the recording sensitivity without deteriorating the erasing characteristics significantly.

It has also been found that, when a recording layer comprises alternately laminated at least two optically active layers the state of each of which reversibly changes between optically recognizable states by the irradiation of, for example, a laser beam and at least one amorphous-acceleration layer comprising a dielectric material and each optically active layer has a specific thickness, the recording sensitivity is increased without deteriorating the erasing characteristics significantly.

Further, it has been found that, when a material of an optically active layer is specified in the above structure, a material which is unstable in its amorphous state and cannot be used to form a recording layer can be stabilized through the increase of the crystallization temperature and used to form the recording layer.

Herein, the amorphous-acceleration layer is provided between a pair of the optically active layers and is defined as a dielectric layer which improves the sensitivity of the recording medium to make it amorphous or increase the crystallization temperature of the amorphous state.

The present invention is now illustrated by making reference to the accompanying drawings.

Figure 1:
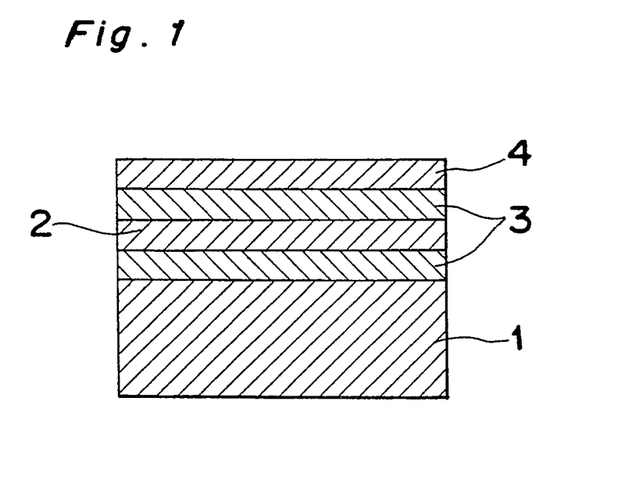
FIG. 1 is a cross section of a first embodiment of an optical information recording medium according to the present invention.

FIG. 1 shows the structure of a first embodiment of the optical information recording medium according to the present invention, which comprises a substrate 1, a recording layer 2, a pair of dielectric layers 3 and a reflective layer 4.

As the substrate 1, a metal, glass and a resin may be used. Preferably, transparent glass, quartz, polycarbonate or polymethyl methacrylate (PMMA) is used. As the recording layer, any material that is known as a phase-change material may be used. Examples of such material are alloys of Te, Se, Sb, In and Ge the state of each of which changes between the amorphous state and the crystalline state or between one crystalline state and another crystalline state. As described below, the effect on the increase of the recording sensitivity varies with the kind of the material. A great effect on the increase of the recording density is achieved when GeSbTe, InSbTe, GaSb, InGaSb, GeSnTe or AgSbTe in a composition region where the crystallization rate is high. In general, the crystallization rate is high at a composition near a stoichiometric compound or a solid solution composition. With the above alloys, those having such composition is preferred. Specific examples of the alloys having such composition are $Ga_{50}Sb_{50}$, $Ag_{25}Sb_{25}Te_{50}$, $In_{50}Sb_{17}Te_{33}$, $Ge_{14}Sb_{29}Te_{57}$, $In_{50}Ga_{25}Sb_{25}$, $Ge_{40}Sn_{10}Te_{50}$, etc. (the ratio being an atomic ratio).

Materials, the amorphous state of which is unstable in the conventional structure but a crystallization temperature of which is increased in the structure of the present invention so that it can be used as the recording layer, are SnTe, PbTe, SnGeTe, SnSbTe, PbSbTe, AuTe, etc. Since the crystallization rate of these alloys may be decreased as the optically active layer is made thin, they preferably have a composition near the stoichiometric compound. Specific compositions are $Sn_{50}Te_{50}$, $Sn_{14}Sb_{29}Te_{57}$ (SnTe. $Sb_2Te_3$) and $Pb_{11}Sb_{32}Te_{57}$ ($2PbTe.3Sb_2Te_3$) which are the stoichiometric compound compositions and those having compositions near these compositions. In addition, $Au_{33}$-$Te_{67}$ and alloys having compositions near this composition have a good effect. When a small amount of Ge is added to the above compositions, or a part of Sn or Pb of the above compositions is substituted with Ge in a concentration such that the concentration of Ge does not exceed the concentration of Sn or Pb, or a very slight amount of Te is substituted with Se, the compositions can provide the recording medium having a large number of rewriting cycles.

The dielectric layer 3 may comprise an oxide, nitride, chalcogenide, fluoride or carbide of a metal or a mixture thereof. Specific examples of the dielectric material are $SiO_2$, $SiO$, $Al_2O_3$, $GeO_2$, $In_2O_3$, $TeO_2$, $TiO_2$, $Ta_2O_5$, $MoO_3$, $WO_3$, $ZrO_2$, $Si_3N_4$, $AlN$, $BN$, $TiN$, $ZnS$, $CdS$, $CdSe$, $ZnSe$, $ZnTe$, $AgF$, $PbF_2$, $MnF_2$, $NiF_2$, $SiC$ or their mixtures. An amorphous carbon film may be used as the dielectric layer.

The reflective layer 4 comprises a thin metal film. Examples of the metal are Au, Al, Ti, Ni, Cr, Cu, Pd, Pt and their alloys such as Au—Al, Ni—Cr, Al—Ti, Al—Cr, Au—Pd and the like.

The characteristics of the recording medium according to the present invention reside in that the recording layer is sandwiched by a pair of the dielectric layers and also the reflective layer is provided and that the thickness of the recording layer is from 1 nm to 10 nm.

As the thickness of the recording layer is reduced from 10 nm, the recording sensitivity increases and reaches the maximum around 5 nm. As the thickness is further decreased, the recording sensitivity begins to increase.

When the recording layer comprises GeSbTe, InSbTe, GaSb, InGaSb, GeSnTe, AgSbTe and the like, the recording sensitivity around the thickness of 5 nm is 30% higher than at the thickness larger than 10 nm. In case of SnTe, PbTe, SnGeTe, SnSbTe, PbSbTe, AuTe and the like, when the thickness of the recording layer is from 1 nm to 10 nm, a stable amorphous state is realized at room temperature and it is possible to provide the recording medium which realizes high speed recording and erasing of the signals.

Figure 2:
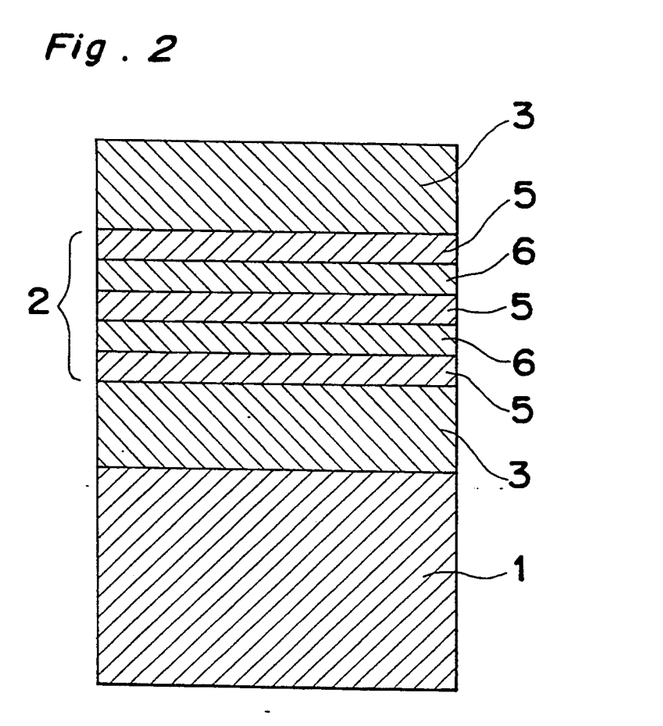
FIG. 2 is a cross section of a second embodiment of an optical information recording medium according to the present invention.

FIG. 2 shows the structure of a second embodiment of the optical information recording medium according to the present invention, which comprises a substrate 1, a recording layer 2 and a pair of dielectric layers 3.

As the substrate, the same material as that used in the above first embodiment of FIG. 1 can be used.

In this embodiment, the recording layer comprises alternately laminated optically active layers 5 and amorphous-acceleration layers 6.

The optically active layer 5 comprises any of the materials which are known as phase-change materials. Specifically, the same alloys as used in the first embodiment are preferred.

The amorphous-acceleration layer 6 comprises a dielectric material which has the same composition as that exemplified in connection with the dielectric layer 3 of the first embodiment, for example, the oxide, nitride, chalcogenide, fluoride, carbide of metals or a mixture thereof. Preferably, the same material as used in the first embodiment is used. Since the amorphous-acceleration layer is required to have properties that it has good heat conductivity to dissipate the heat generated in the optically active layers and that it is not thermally decomposed upon exposure to the laser beam, it should have a large coefficient of thermal conductivity and a high melting point. Then, the amorphous-acceleration layer more preferably comprises $Al_2O_3$, $TiO_2$, $WO_3$, $Si_3N_4$, $AlN$, $BN$, $TiN$, $ZnS$, $ZnSe$, $SiC$ or a mixture thereof. Further, the amorphous carbon layer or a mixture of $ZnS$ and $SiO_2$ is also preferred.

Figure 3:
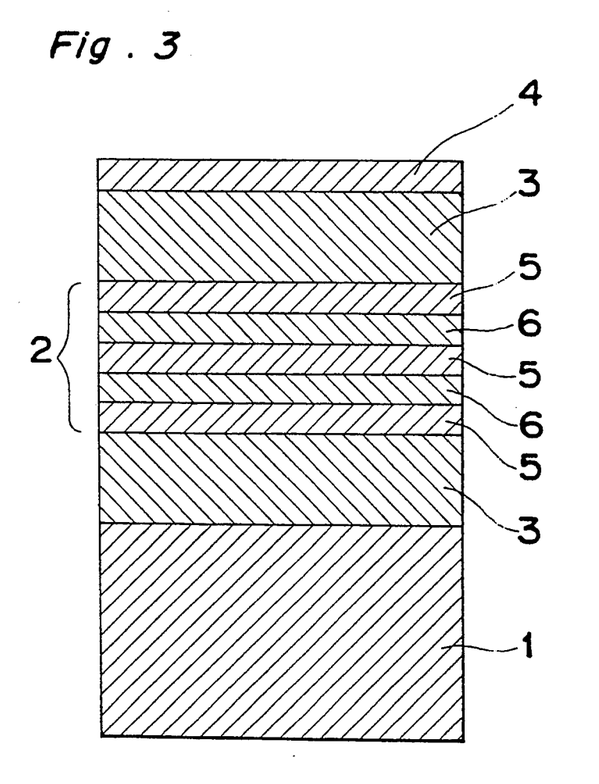
FIG. 3 is a cross section of a third embodiment of an optical information recording medium according to the present invention.

FIG. 3 shows the structure of a third embodiment of the optical information recording medium according to the present invention, which has substantially the same structure as that of the second embodiment except that a reflective layer 4 is further provided. The reflective layer may comprise the thin metal film as used in the first embodiment.

The characteristics of the second and third embodiments of the recording medium according to the present invention reside in that the recording medium comprises alternately laminated the optically active layers the state of which reversibly changes between the optically distinguishable states and the amorphous-acceleration layers and the recording layer is sandwiched by a pair of the dielectric layers and that the thickness of each of the optically active layers is from 1 nm to 10 nm.

When the recording layer comprises GeSbTe, InSbTe, GaSb, InGaSb, GeSnTe, AgSbTe and the like, the recording sensitivity around the thickness of 5 nm is 30% higher than at the thickness larger than 10 nm. In case of SnTe, PbTe, SnGeTe, SnSbTe, PbSbTe, AuTe and the like, when the thickness of the recording layer is from 1 nm to 10 nm, a stable amorphous state is realized at room temperature and it is possible to provide the recording medium which realizes high speed recording and erasing of the signals.

The reasons why the recording sensitivity of the first, second and third embodiments of the recording medium according to the present invention is increased may be assumed as follows:

First, since the optically active layer is very thin and has a small heat capacity, it is easily cooled so that it is easily made amorphous. In the conventional recording medium, the recording layer, namely the optically active layer is rather thick and has a large heat capacity, so that a large cooling rate cannot be achieved.

A second reason is the decrease of the crystallization rate (prolongation of the crystallization time). When the crystallization rate is high, the optically active layer is crystallized during cooling after melting and hardly made amorphous. However, the structures of the present invention can decrease the crystallization rate and then it becomes easy to make the optically active layer amorphous. A cause for the decrease of the crystallization rate may be that mobility of the atoms in the layer is limited or crystallization nuclei are less formed, by the decrease of the thickness of the optically active layer.

In fact, the recording sensitivity may be increased by a synergistic effect of the above two reasons. In view of the fact that the materials having higher crystallization rates are more effective, the increase of the recording sensitivity may be largely attributed to the second reason.

The reason why the material which is unstable at room temperature in the conventional structure is made stable at room temperature by the selection of the material composition of the optically active layer may be the increase of the crystallization temperature. The increase of the crystallization temperature may be attributed to the following two causes:

First, since the optically active layer is very thin and has a small heat capacity, it is easily cooled so that the atoms are more randomly distributed in the amorphous state and then, as a whole, the layer becomes more homogeneous. In the conventional structure, since the optically active layer is thick and a large cooling rate is not achieved, the crystallization nuclei generate and the crystal grows during cooling so that the material is easily crystallized at room temperature.

Second, since the optically active layer is thin, the mobility of the atoms in the layer is limited so that the crystalline nuclei are less formed or the crystal grows slowly.

In the above first and third embodiments of the recording medium, since the laser beam is irradiated from the substrate side, the dielectric layer, the recording layer, the dielectric layer and the reflective layer are laminated on the substrate in this order. When the laser beam is irradiated from the side opposite to the substrate, the reflective layer, the dielectric layer, the recording layer and the dielectric layer are laminated on the substrate in this order.

In the second and third embodiments, the thickness $d_2$ of the amorphous-acceleration layer should in the following range:

$$\tfrac{1}{3} \leq d_1/d_2 \leq 3$$

wherein $d_1$ is the thickness of the optically active layer. When the thickness of the amorphous-acceleration layer is small, the number of the repeated recording and erasing decreases. The lower limit of the amorphous-acceleration layer is set since the upper and lower surfaces of the amorphous-acceleration layer contact to the optically active layers so that the too thin amorphous-acceleration layer may be destroyed when the optically active layer is molten. When the amorphous-acceleration layer is too thick, both the recording and erasing sensitivities are deteriorated. This may be because the amount of the optically active material contained in the recording layer is decreased so that the sensitivities are deteriorated.

The optical information recording medium of the present invention can be produced by the same method for the production of a thin film. One of the important factors in the production is that, since the optically active layer is very thin, an oxide layer is formed if it is exposed to air, whereby an interfacial surface becomes uneven so that the number of repeated recording and erasing decreases. Therefore, at least the optically active layers and the amorphous-acceleration layers are preferably formed in-line without interrupting a vacuum condition. To this end, the production examples described later used a spattering apparatus which can produce a film from plural targets or a vapor deposition apparatus which can form a film from plural evaporation sources and in-line formed the optically active layers and the amorphous-acceleration layers alternately without interrupting the vacuum condition.

To simplify the production steps, the amorphous-acceleration layers and the dielectric layers are preferably made of the same material. Since the amorphous-acceleration layers and the dielectric layers are formed using a single source, the production apparatus can be made simple.

PREFERRED EMBODIMENTS OF THE INVENTION

The present invention will be illustrated by the following Examples.

The first group of Examples, namely Examples 1 to 5 show the increase of the recording sensitivity through the reduction of the thickness of the optically active layers.

Example 1

Figure 4:
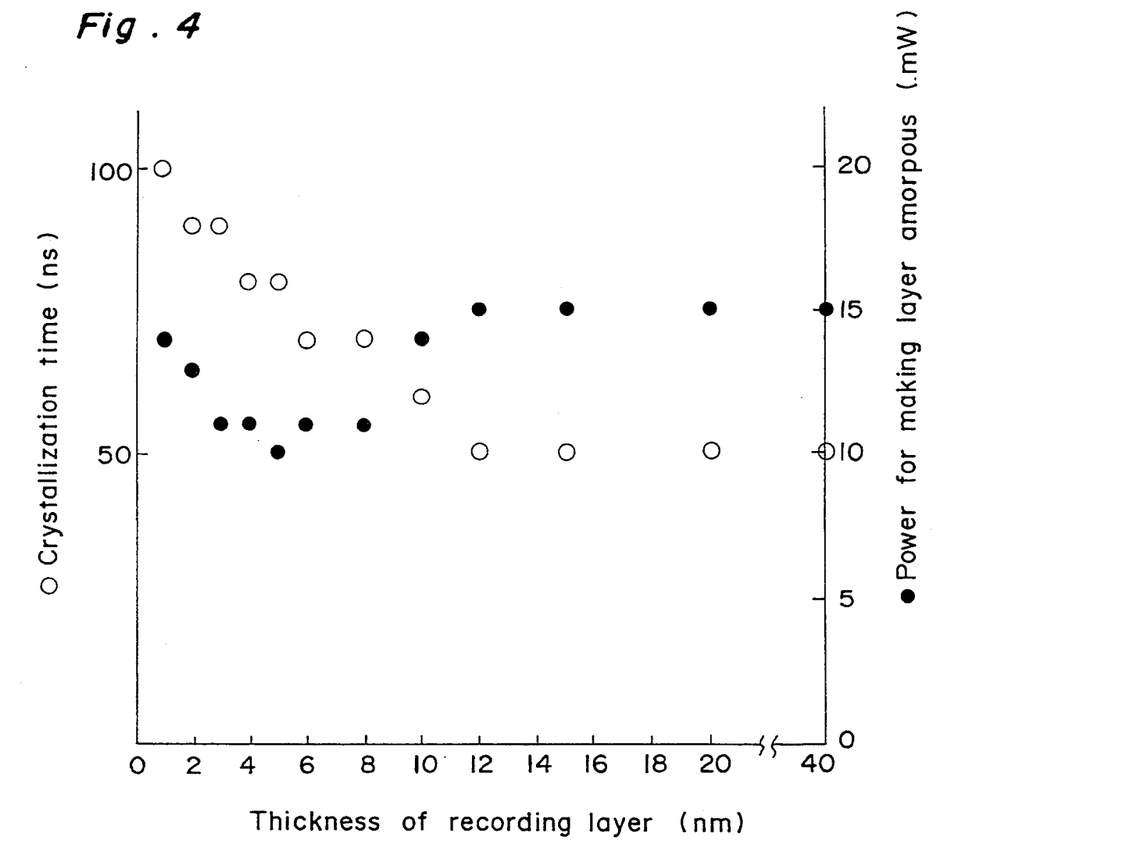
FIGS. 4, 5 and 6 are graphs showing relationships of the thickness of a recording layer or an optically active layer with the power required for making the recording layer amorphous and the crystallization time in the first, second and third embodiments of FIGS. 1, 2 and 3, respectively.

This Example shows relationships of the thickness of a recording layer with the power required for making the recording layer amorphous and the crystallization time in the first embodiment of the optical information recording medium.

On a polymethyl methacrylate (PMMA) substrate of 12 mm × 18 mm, a dielectric layer, a recording layer and a dielectric layer were in-line vapor deposited in this order and finally a reflective layer was vapor deposited to produce a sample. With varying the thickness of the recording layer, the relationship of the thickness of the recording layer with the power required for making the recording layer amorphous and the crystallization time were studied.

As the dielectric layer, ZnS containing 20% by mole of $SiO_2$ (hereinafter referred to as "$ZnS-SiO_2$") was used. The dielectric layer on the substrate side had a thickness of 100 nm, and that on the reflective layer side had a thickness of 25 nm.

As the recording layer, an alloy having a composition of $Ge_{14}Sb_{29}Te_{57}$ was used. This alloy was amorphous in the as-deposited state. The thickness of the recording layer was changed from 1 nm to 40 nm.

The reflective layer was made of gold (Au) and had a thickness of 50 nm.

With each of the samples, the crystallization time and the power required for making the recording layer amorphous (the sensitivity for making a material amorphous) were measured. For measurement, was used an apparatus which can irradiate the sample by laser pulses of 830 nm which was reduced to the wavelength limit with changing the pulse width and the power and detect change of the optical characteristics of the irradiated part as a change of the reflectance of the recording medium, which apparatus was reported as "Static Tester" in Proc. of SPIE, Vol. 695, 79.

The crystallization time was defined in terms of a pulse width at which the crystallization was first observed when the laser pulses were irradiated on the sample with changing the pulse width and the power and the change of the reflectance was monitored. The pulse width at which the crystallization started decreased as the power increased. But, at a power level over a certain value, the recording layer was molten before it was crystallized. Then, the crystallization time defined herein was the pulse width at which the crystallization was observed at earliest timing irrespective of the power.

The sensitivity for making the material amorphous was measured by the same manner as used for measuring the crystallization time, and defined as the minimum power required for making the material amorphous when the laser pulse having a constant pulse width was irradiated on the crystalline material.

FIG. 4 shows the results of the above measurements. When the thickness of the recording layer was thicker than 10 nm, both the crystallization time and the power required for making the recording layer amorphous were constant. In the thickness range of smaller than 10 nm, the crystallization time was prolonged while the power for making the recording layer amorphous decreased. This means that the recording sensitivity increased.

As the thickness of the recording layer decreased, the power for making the recording layer amorphous started to decrease at the thickness of 10 nm, greatly decreased at the thickness of 8 nm and reached the minimum around the thickness of around 5 nm. Since such decrease of the power appeared simultaneously with the prolongation of the crystallization time, a main reason for such decrease may be that the material tends to be made amorphous more easily due to the prolongation of the crystallization time.

When the thickness of the recording layer was decreased further, the power for making the recording layer amorphous started to increase and greatly increased from the thickness of 3 nm. This may be due to decrease of absorption of the power by the recording layer because of the small thickness of the recording layer.

From the above results, it is understood that, when the thickness of the recording layer is 10 nm or less, the recording sensitivity increases, in particular, from 3 nm to 8 nm, the recording sensitivity greatly increases and, around 5 nm (e.g. from 4.5 to 5.5. nm), the recording power is minimum.

Though $Ge_{14}Sb_{29}Te_{57}$ was used as the recording layer material in this Example, when other material comprising Ge, Sb and Te of a different composition or a different alloy is used as the recording layer material, the recording sensitivity increases at a thickness of about 10 nm or less and reaches the maximum around 5 nm.

Example 2

Figure 5:
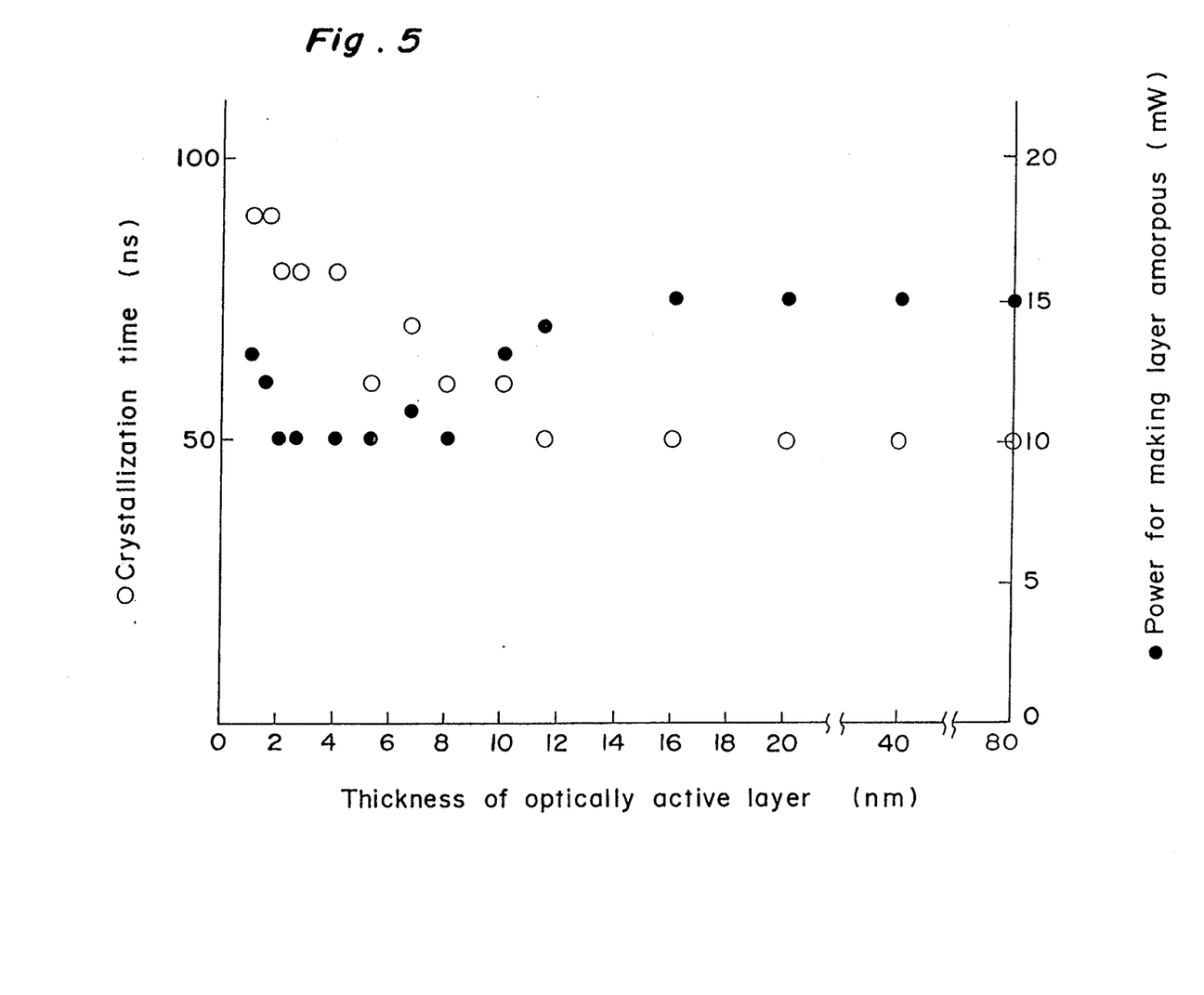

This Example shows relationships of the thickness of an optically active layer with the power required for making the recording layer amorphous and the crystallization time in the second embodiment of the optical information recording medium.

On a polymethyl methacrylate (PMMA) substrate of 12 mm × 18 mm, a dielectric layer, a recording layer and a dielectric layer were vapor deposited in this order to produce a sample. The recording layer consisted of N optically active layers a total thickness of which was 80 nm (then a thickness of each optically active layer being 80/N nm) and amorphous-acceleration layers each of which had the same thickness as that of the optically active layer. With changing N from 1 to 80, namely changing the thickness of each layer, the relationship of the thickness of the optically active layer with the power required for making the recording layer amorphous and the crystallization time were studied. When N was 1 (one), the thickness of each layer was 80 nm, while when N was 80, the thickness of each layer was 1 (one) nm.

As the dielectric layer and the amorphous-acceleration layers, $ZnS-SiO_2$ was used. The dielectric layer on the substrate side had a thickness of 100 nm, and that on the opposite side had a thickness of 200 nm.

As the optically active layer, an alloy having a composition of $Ge_{14}Sb_{29}Te_{57}$ was used.

With each of the produced samples, the crystallization time and the power for making the recording layer amorphous were measured in the same manner as in Example 1.

FIG. 5 shows the results of the above measurements. When the thickness of the optically active layer was thicker than 10 nm, both the crystallization time and the power required for making the recording layer amorphous were constant. In the thickness range of smaller than 10 nm, the crystallization time was prolonged while the power for making the optically active layer amorphous decreased. This means that the recording sensitivity increased.

As the thickness of the recording layer decreased, the power for making the recording layer amorphous started to decrease at the thickness of 10 nm, greatly decreased around the thickness of 8 nm and reached the minimum around the thickness of 5 nm. Since such decrease of the power appeared simultaneously with the prolongation of the crystallization time, a main reason for such decrease may be that the material tends to be made amorphous more easily due to the prolongation of the crystallization time.

From the above results, it is understood that, when the thickness of the recording layer is 10 nm or less, the recording sensitivity increases, in particular, from 2 nm to 8 nm, the recording sensitivity greatly increases and, around 5 nm, the recording power is minimum.

Though $Ge_{14}Sb_{29}Te_{57}$ was used as the recording layer material in this Example, when other material comprising Ge, Sb and Te of a different composition or a different alloy is used as the recording layer material, the recording sensitivity increases at a thickness of about 10 nm or less.

Example 3

Figure 6:
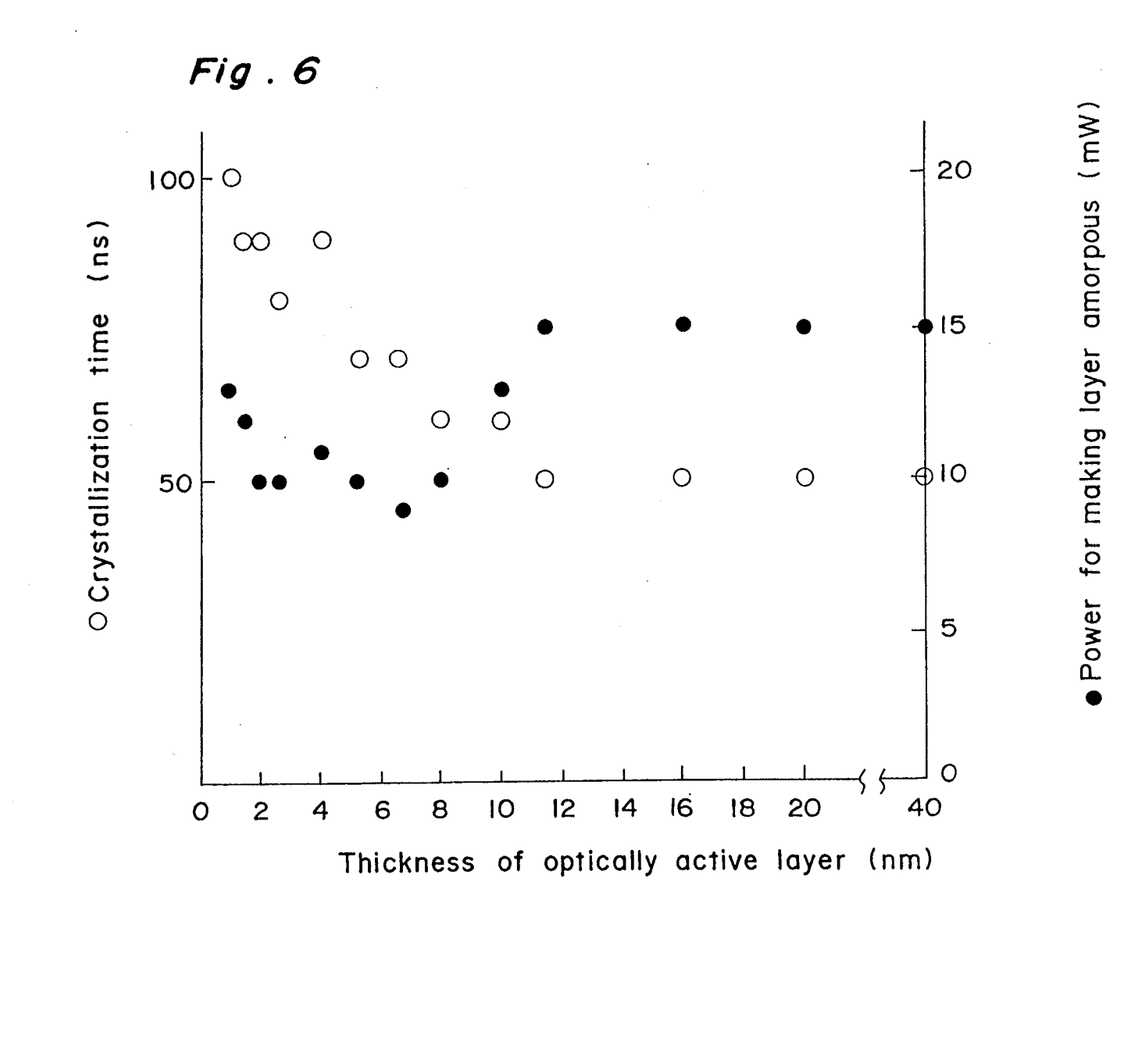

This Example shows relationships of the thickness of an optically active layer with the power required for making the recording layer amorphous and the crystallization time in the third embodiment of the optical information recording medium.

On the same polymethyl methacrylate substrate as used in Example 2, a dielectric layer, a recording layer, a dielectric layer and a reflective layer were vapor deposited in this order to produce a sample. The recording layer consisted of N optically active layers the total thickness of which was 40 nm (then the thickness of each optically active layer being 40/N nm) and amorphous-acceleration layers each of which had the same thickness as that of the optically active layer. With changing N from 1 to 40, namely changing the thickness of each layer, the relationship of the thickness of the recording layer with the power required for making the recording layer amorphous and the crystallization time were studied. When N was 1 (one), the thickness of each layer was 40 nm, while when N was 40, the thickness of each layer was 1 (one) nm.

As the dielectric layer and the amorphous-acceleration layers, $ZnS-SiO_2$ was used. The dielectric layer on the substrate side had a thickness of 140 nm, and that on the reflective layer side had a thickness of 200 nm.

As the optically active layer, an alloy having a composition of $Ge_{14}Sb_{29}Te_{57}$ was used.

The reflective layer was made of gold and had a thickness of 50 nm.

With each of the produced samples, the crystallization time and the power for making the recording layer amorphous were measured in the same manner as in Example 1.

FIG. 6 shows the results of the above measurements. When the thickness of the optically active layer was thicker than 10 nm, both the crystallization time and the power required for making the recording layer amorphous were constant. In the thickness range of smaller than 10 nm, the crystallization time was prolonged while the power for making the optically active layer amorphous decreased. This means that the recording sensitivity increased.

As the thickness of the recording layer decreased, the power for making the recording layer amorphous started to decrease at the thickness of 10 nm and reached the maximum around the thickness of 8 nm. These results were the same as those in Example 2 using no reflective layer. In both structures, the main reason for the decrease of the power for making the optical layer amorphous may be that the material tends to be made amorphous more easily due to the prolongation of the crystallization time.

From the results of Examples 1, 2 and 3, it is understood that the recording sensitivity can be increased when the thickness of the recording layer is 10 nm or less, irrespective of the number of the optically active layers or the presence or absence of the reflective layer.

The thickness required for the amorphous-acceleration layer used in the second and third embodiments will be investigated in following Example 4.

Example 4

On the same polymethyl methacrylate substrate as used in Example 2, a dielectric layer, a recording layer and a dielectric layer were formed by spattering in this order to produce a sample. The recording layer consisted of 20 optically active layers the total thickness of which was 80 nm (then the thickness of each optically active layer being 4 nm) and amorphous-acceleration layers. The thickness of each amorphous-acceleration layer was changed from 1 nm to 40 nm, and the power for making the optically active layer amorphous and the cyclability between the crystalline state and the amorphous state were studied. The cyclability was measured by repeatedly converting the optically active layer from one state to the other using the same apparatus as used in Example 1 for measuring the power for making the recording layer amorphous and the crystallization time. The number of the conversions at which no change of the reflectance was observed was recorded as the repeating number of the conversion. The same properties were measured with a sample in which ten optically active layers were formed.

As the dielectric layer and the amorphous-acceleration layers, ZnS—SiO$_2$ was used. The dielectric layer on the substrate side had a thickness of 100 nm, and that on the reflective layer side had a thickness of 200 nm.

As the amorphous-acceleration layer, Si$_3$N$_4$ was used, and as the optically active layer, an alloy having a composition of Ge$_{14}$Sb$_{29}$Te$_{57}$ was used.

Figure 7:
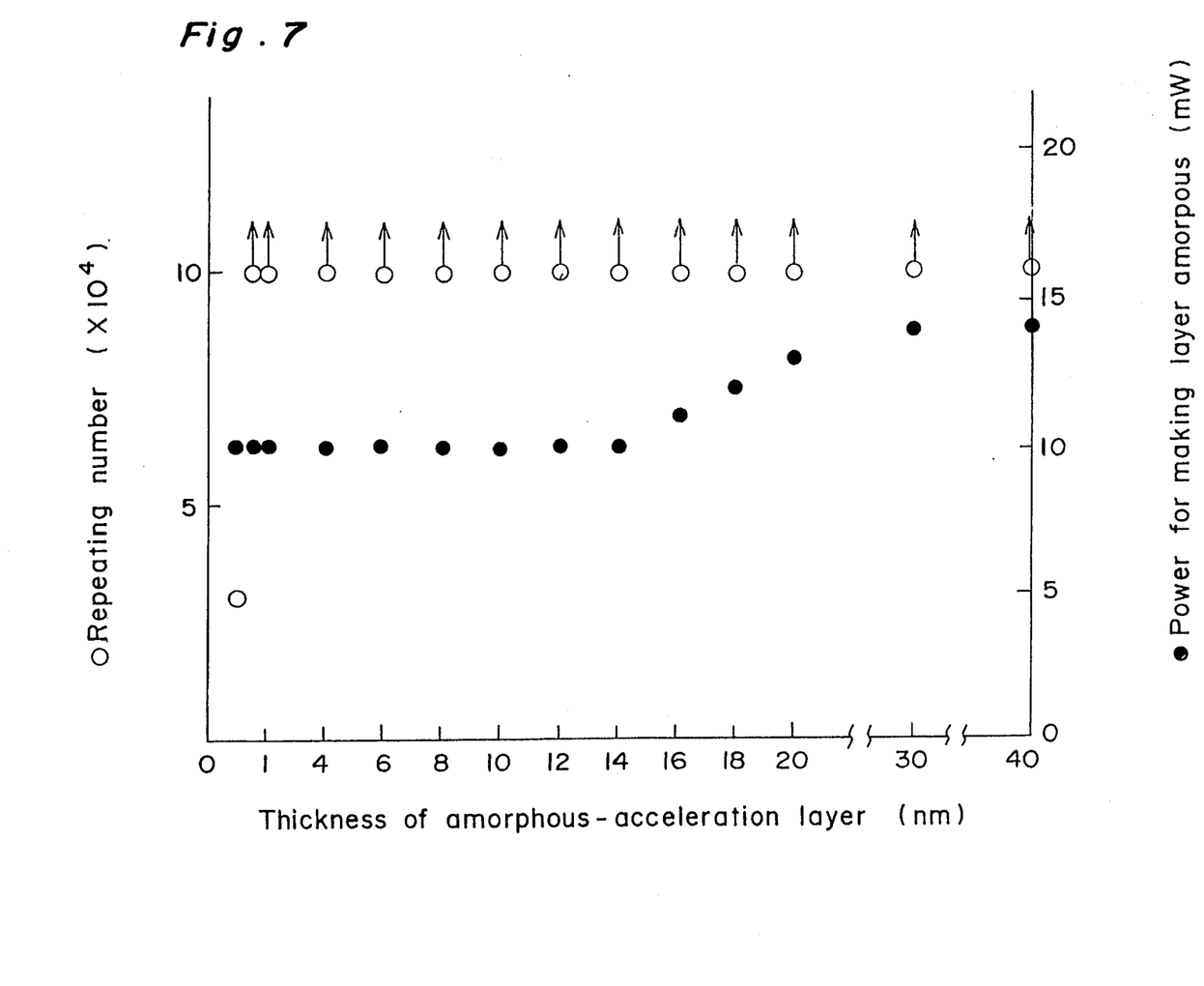
FIGS. 7 and 8 are graphs showing relationships of the thickness of an amorphous-acceleration layer with the repeating number of conversions and the power required for making the optically active layer amorphous.
Figure 8:
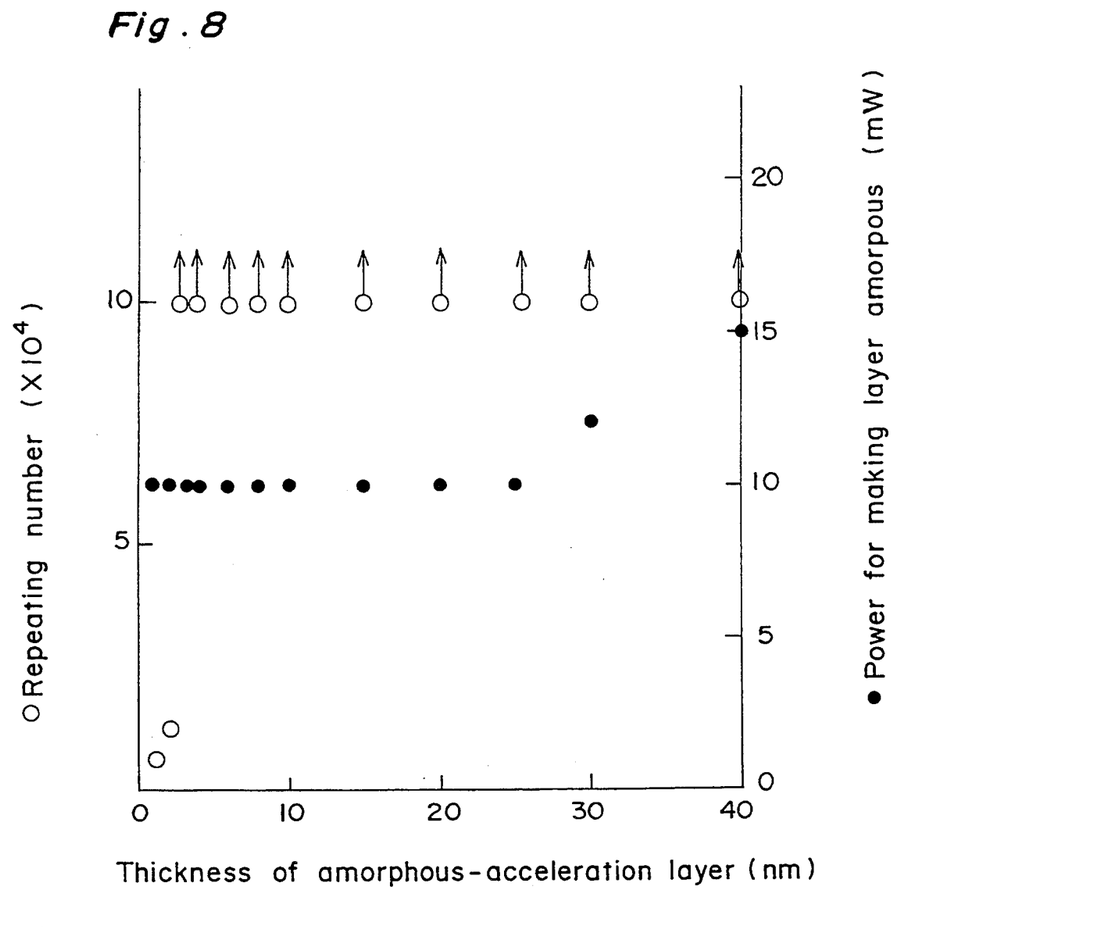

FIGS. 7 and 8 show the results of the above measurements with the sample having 20 optically active layers and one having 10 optically active layers, respectively.

As seen from FIG. 7, when the optically active layer was divided to 20 sublayers, the power for making the optically active layer amorphous was constant in a range of the amorphous-acceleration layer thickness of 15 nm or smaller but started to increase from around 15 nm. As to the cyclability, when the thickness of the amorphous-acceleration layer was 1.5 nm or larger, the change of the reflectance was observed even after the 100,000 times repeating conversions. When the thickness of the amorphous-acceleration layer was 1 nm, the repeating number decreased to 30,000. Accordingly, when the optical layer was divided to 20 sublayers, namely when the thickness of a single sublayer was 4 nm, the thickness of the amorphous-acceleration layer consisting of Si$_3$N$_4$ should be from about 1.5 nm to about 15 nm.

As seen from FIG. 8, when the optically active layer was divided to 10 sublayers, the power for making the optically active layer amorphous was constant in a range of the amorphous-acceleration layer thickness of 25 nm or smaller but started to increase above 25 nm. As to the cyclability, when the thickness of the amorphous-acceleration layer was 3 nm or larger, the change of the reflectance was observed even after the 100,000 times repeating conversions. When the thickness of the amorphous-acceleration layer was 2 nm, the repeating number decreased to 10,000. Accordingly, when the optical layer was divided to 10 sublayers, namely when the thickness of a single sublayer was 8 nm, the thickness of the amorphous-acceleration layer consisting of Si$_3$N$_4$ should be from about 3 nm to about 25 nm.

From the above results, it is understood that, when the optically active layer has the composition of Ge$_{14}$Sb$_{29}$Te$_{57}$ and the amorphous-acceleration layer is made of Si$_3$N$_4$, the thicknesses of these layers preferably satisfy the equation:

$$\tfrac{1}{8} \leq d_1/d_2 \leq 3$$

in which $d_1$ and $d_2$ are thicknesses of the optically active layer and the amorphous-acceleration layer, respectively.

Optical information recording media are produced by using GeSbTe, GeSnTe, AgSbTe or InSbTe as an optically active layer and Al$_2$O$_3$, TiO$_2$, WO$_3$, AlN, BN, TiN, ZnS, ZnSe, SiC, SiO, SiO$_2$, TeO$_2$, GeO$_2$, PbF or ZnS—SiO$_2$ as an amorphous-acceleration layer in various combinations. When Al$_2$O$_3$, TiO$_2$, WO$_3$, AlN, BN, TiN, ZnS, ZnSe, SiC or ZnS—SiO$_2$ is used as the amorphous-acceleration layer, the power for making the optically active layer amorphous and the cyclability are good provided that the thicknesses of the layers satisfy the above equation. However, when SiO, SiO$_2$, TeO$_2$, GeO$_2$ or PbF is used as the amorphous-acceleration layer, the repeating number is small. This may be because the compound in the latter group has a low melting point or a small thermal conductivity and therefore it is thermally damaged upon exposure to the laser beam and the amorphous-acceleration layer is destroyed. Then, as the amorphous-acceleration layer, a material having a high melting point and a large thermal conductivity seems to be preferred.

To find out which kind of a material is effective to increase the recording sensitivity, some experiments were carried out in following Examples.

Example 5

To investigate how much the recording sensitivity of various materials is increased by the structure of the present invention, two samples having different structures were produced. One sample was a reference one and consisted of a glass substrate of 12 nm × 18 nm and an optically active layer having a thickness of 80 nm which was directly formed on the substrate (Sample I). The other sample consisted of a PMMA substrate of 12 nm × 18 nm, and a dielectric layer having a thickness of 100 nm, a recording layer consisting of alternately laminated optically active layers and amorphous-acceleration layers and a dielectric layer having a thickness of 200 nm which were laminated on the substrate in this order (Sample II). The recording layer consisted of 20 optically active layers each having a thickness of 4 nm and 19 amorphous-acceleration layers each having a thickness of 4 nm and being interposed between a pair of adjacent optically active layers. The dielectric layers and the amorphous-acceleration layers were made of ZnS—SiO$_2$ (ZnS containing 20% by mole of SiO$_2$). All the layers were formed by vapor deposition.

With each of these two samples, the crystallization time and the power for making the optically active layer were measured in the same manner as in Example 1. Since In$_{50}$Sb$_{50}$ is converted between a semi-stable crystalline state and a stable crystalline state, a phase transition time between these two state and a power for causing phase transition were recorded.

The composition of the optically active layer, the crystallization time and the power for making the optically active layer amorphous are shown in the following Table.

TABLE

| Composition | Crystallization time (ns) | | Power for making optically active layer amorphous (mW) | |
|---|---|---|---|---|
| | Sample I | Sample II | Sample I | Sample II |
| Ga$_{50}$Sb$_{50}$ | 30 | 50 | 20 | 14 |
| Ag$_{25}$Sb$_{25}$Te$_{50}$ | 30 | 60 | 17 | 11 |
| In$_{50}$Sb$_{17}$Te$_{33}$ | 50 | 70 | 16 | 10 |
| Ge$_{14}$Sb$_{29}$Te$_{57}$ | 50 | 80 | 17 | 10 |
| In$_{50}$Ga$_{25}$Sb$_{25}$ | 50 | 80 | 16 | 12 |
| Ge$_{40}$Sn$_{10}$Te$_{50}$ | 70 | 100 | 16 | 11 |
| Sb$_{40}$Te$_{50}$Se$_{10}$ | 200 | 300 | 12 | 11 |
| Ge$_{50}$Te$_{40}$Se$_{10}$ | 300 | 500 | 10 | 9 |
| In$_{50}$Sb$_{50}$ | 300 | 400 | 9 | 8 |
| Te$_{60}$Ge$_5$Sn$_{10}$Au$_{25}$ | 700 | 1000 | 6 | 5 |

From the results of the above Table, it is understood that the structures of the present invention using any of the above materials can achieve the prolongation of the crystallization time and the decrease of the power for making the optically active layer amorphous.

That is, from the results of this Example, it may be possible to conclude that the characteristic of the optically active material which is particularly effective in the present invention is that its state can be reversibly changed by the irradiation of the laser beam having a pulse width of 100 ns or less when the optically active compound layer having a thickness of 80 nm is laminated directly on the glass substrate. Specific examples of such compound are alloys of GeSbTe, InSbTe, GaSb, InGaSb, GeSnTe, AgSbTe and the like. With these alloys, the high crystallization rate is achieved by a composition near the stoichiometric composition. Therefore, it is preferred to use the alloys having such composition in the present invention.

In this Example, the optically active layers were laminated with interposing the amorphous-acceleration layers. When a recording layer consists of one optically active layer like the first embodiment of FIG. 1, the same results are obtained.

Examples 1 to 5 which are described above show the increase of the recording sensitivity through the decrease of the thickness of the optically active layer. Following Examples show that a material an amorphous state of which is unstable at room temperature in the conventional structure can be stabilized even at room temperature by the structure of the present invention.

Example 6

On a glass substrate having a thickness of 1.2 mm, SnTe or PbTe thin layers each having a thickness of 0.5 nm, 1 nm, 2 nm, 3 nm, 4 nm, 5 nm, 6 nm, 7 nm, 8 nm, 9 nm, 10 nm, 15 nm or 20 nm and a SiO$_2$ film having the same thickness as the SnTe or PbTe thin layer were alternately laminated by spattering. Then, a SiO$_2$ film having thickness of 10 nm was formed in-line. A total thickness of the SnTe or PbTe layers and the SiO$_2$ films was increased to a thickness with which X-ray diffraction was possible. Then the structure of the formed layers was analyzed by X-ray diffraction. With both the PbTe layer and the SnTe layer the following results were obtained.

With the sample in which the PbTe or SnTe layer had the thickness of 10 nm, a diffraction peak assignable to a crystal appeared. In the samples in which PbTe or SnTe layer had the thickness of 15 and 20 nm, the layer was in the complete crystal state. When the layer thickness was less than 10 nm, no diffraction peak assignable to a crystal appeared.

Using the above described static tester, the laser beam was irradiated on each sample under various conditions.

When the PbTe or SnTe layer had the thickness of 2 nm or larger, the reflectance was changed by the irradiation of the laser beam having a pulse width of 200 ns and the layer was crystallized.

When the layer thickness was 1 nm, a laser beam having a larger pulse width was required to crystallize the layer.

When the layer thickness was 0.5 nm, crystallization caused by the irradiation of the laser beam could not be recognized.

Thereafter, on the crystallized samples, the laser beam was irradiated by changing the irradiation conditions. When the layer had the thickness of 10 nm or less, the layer was converted to the amorphous state, and the samples in which the layer thickness was from 1 nm to 5 nm had better sensitivity than the samples in which the layer thickness was larger, and were easily made amorphous.

Example 7

In the same manner as in Example 6 but using SnSb$_2$Te$_4$ or Pb$_2$Sb$_6$Te$_{11}$ as the optically active layer and ZnS as an amorphous-acceleration layer, a sample was produced by spattering and subjected to the same test. The following results were obtained.

The optically active layer having the thickness of 20 nm was completely crystallized, while that having the thickness of 15 nm gave a diffraction peak which indicated slight crystallization. When the layer had the thickness of less than 15 nm, no diffraction peak assignable to the crystal appeared.

Using the above described static tester, the laser beam was irradiated on each sample under various conditions.

When the optically active layer had the thickness of 2 nm or larger, the reflectance was changed by the irradiation of the laser beam having a pulse width of 200 ns and the layer was crystallized.

When the layer thickness was 1 nm, a laser beam having a larger pulse width was required to crystallize the layer.

When the layer thickness was 0.5 nm, crystallization caused by the the irradiation of the laser beam could not be recognized.

Thereafter, on the crystallized samples, the laser beam was irradiated by changing the irradiation conditions. When the layer had the thickness of 10 nm or less, the layer was converted to the amorphous state, and the samples in which the layer thickness was from 1 nm to 5 nm had better sensitivity than the samples in which the layer thickness was larger, and were easily made amorphous.

Example 8

On a PMMA plate or a polycarbonate plate each having a thickness of 1.2 mm as a substrate, ZnS layers each having a thickness of 10 nm, optically active layers of SnTe or PbTe having the same thickness were alternatively laminated and finally a ZnS layer having a thickness of 10 nm was laminated by spattering without interrupting a vacuum condition (in-line). On the laminated layers, the same plate as the substrate was adhered using a UV-light curable resin. The thickness of each optically active layer was changed by 0.5 nm from 5 nm to 20 nm. Each sample was subjected to the same test as in Example 7.

According to the X-ray diffraction analysis, with both materials, the optically active layers having the thickness of less than 10 nm realized the amorphous state, and it was difficult to crystallize the layer having the thickness of 0.5 nm.

Example 9

On a disc substrate which had a diameter of 130 mm and a thickness of 1.2 mm and, on a surface, a spiral groove track for guiding a laser beam (width, 0.65 mm; depth, 0.7 μm; pitch, 1.6 μm), ZnS—SiO$_2$ layers and Sn$_{40}$Ge$_{10}$Te$_{50}$ layers were alternately laminated and finally a ZnS—SiO$_2$ layer was laminated by spattering. A pair of the formed disc substrates were adhered with facing the recording layers inside to produce an optical disc. The thickness of the optically active layer was 3 nm, and the thickness of the amorphous-acceleration layer was 0.5 nm, 1 nm, 3 nm, 5 nm, 7 nm, 9 nm or 11 nm. The total number of the laminated layers were selected so that the total thickness was about 100 nm. Each recording layer was formed in the amorphous state.

On a laboratory deck including a semiconductor laser which generates a laser beam having a wavelength of 830 nm with the maximum output power of 40 mW, the optical disc was rotated at 1800 rpm to effect a laser beam recording and erasing test.

The used laboratory deck had a well known construction in this technical field and comprised mechanical disc servomechanisms (rotation, focusing and tracking), a driving circuit for the laser beam generation (power servomechanism) and an optical recording head (a numerical aperture of an objective lens being 0.5).

When the laser beam was irradiated with selecting the irradiation power on each optical disc, the optically active layer of each optical disc was crystallized at a certain power $P_1$ which was specific to each optical disc, and the crystallized layer was converted to the amorphous state at a certain power $P_2$ which was larger than $P_1$. This confirmed that signals could be recorded and erased.

As the thickness of the amorphous-acceleration layer increased, the sensitivity decreased. When the amorphous-acceleration layer had a thickness of 11 nm, an area in which the compound could be made amorphous was decreased.

Then, with each of the above discs, the laser beam was irradiated alternately at the power $P_1$ and the power $P_2$. At each irradiation, the reflectance of the disc was measured. With the disc comprising the amorphous-acceleration layer having a thickness of 0.5 nm, the reflectance was greatly shifted only after several irradiations and the structure was destroyed. When the thickness of the amorphous-acceleration layer was 1 nm or larger, no deterioration was observed after 1000 times irradiations.

Example 10

Using a M—Te—Ge alloy in which M is Sn or Pb having a composition near SnTe or PbTe, the following experiments were carried out.

On a PMMA substrate, ten ZnS layers each having a thickness of 2 nm and ten M-Te-Ge layers each having a thickness of 2 nm and various compositions were alternately laminated and finally a ZnS layer was laminated. On the layers, the same plate as the substrate was laminated to produce a recording medium.

Figure 9:
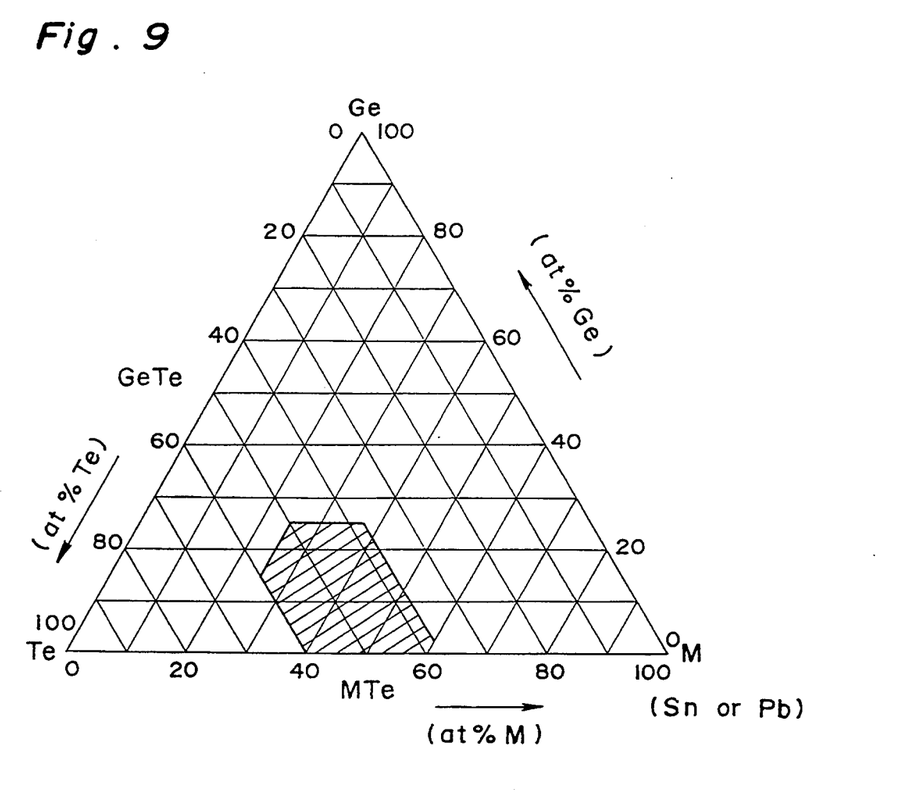
FIG. 9 is a ternary diagram of an M—Te—Ge alloy including a preferred composition region for the optically active layer.

Using the above described static tester, the laser beam having a pulse width of 200 ns was irradiated on each sample to repeatedly effect crystallization (with a power of 8 mW on the sample surface) and conversion to an amorphous state (with a power of 20 mW on the sample surface). In the hatched area shown in FIG. 9, that is, when the alloy had a composition: $M_xGe_yTe_z$ wherein $25 \leq x \leq 60$, $0 \leq y \leq 25$ and $37.5 \leq z \leq 60$, the following requirements were satisfied:
1) An amorphous layer is formed.
2) A layer can be crystallized.
3) The number of repeating conversion exceeds 1000 times.
4) There is not shift in the reflectance during the conversions.

The same experiments were carried out with changing the pulse width, and it was found that, on the composition line of MTe—GeTe, the recording and erasing could be done in a short time of 100 ns or shorter.

Example 11

In the same manner as in Example 10 but using a composition near a ternary composition of SnSb$_2$Te$_4$ or Pb$_2$Sb$_6$Te$_{11}$, the experiments were carried out. In this case, the above described requirements were satisfied when the deviation of the content of each element was within ±5 atomic percentages from the above stoichiometric composition.

Example 12

A part of Sn or Pb in the alloy used in Example 11 was substituted with Ge, and the same experiments as in Example 11 were carried out. The substitution with Ge improved the sensitivity for making the optically active layer amorphous. More than 5000 times repeated recording and erasing were possible.

When the concentration of Ge exceeded that of Sn or Pb, the sensitivity for crystallization was decreased.

Example 13

On the same glass disc substrate as used in Example 9, a ZnS—SiO$_2$ layer having a thickness of 100 nm was formed. Then, on this layer, 15 Sn$_{47}$Ge$_3$Te$_{50}$ layers each having a thickness of 2.5 nm and 15 ZnS—SiO$_2$ layers each having a thickness of 5 nm were alternately laminated. Further, a ZnS—SiO$_2$ layer having a thickness of 100 nm and an Al—Cr (Cr content, 5 atomic %) having a thickness of 50 nm were laminated. A pair of the formed disc substrates were adhered with facing the recording layers inside to produce an optical disc.

This optical disc was rotated at 1800 rpm and a recording test was carried out at the outermost peripheral part (a linear speed of 15 m/sec.). First, a laser beam was continuously irradiated at a power of 10 mW on the recording plane to crystallize one track. Then, the laser beam was irradiated on the crystallized track by modulating the laser power between a peak level of 20 mW and a bias level of 10 mW at a frequency of 5 MHz. Parts of the crystallized track irradiated at the peak level were converted to the amorphous state and signals were recorded. When the recorded signals were reproduced by continuously irradiating the laser beam at 1 mW, a CN ratio of 50 dB was obtained with the 5 MHz component.

By modulating the laser power at 2 MHz, the laser beam was irradiated on the recorded track. The 50 MHZ component was decreased by 35 dB in comparison with that of before irradiation, while the 2 MHz component exhibited a CN ratio of 50 dB.

The above tests indicated that, by the irradiation of the two different laser beams having the different frequency, it was possible to rewrite the information on the optical disc.

What is claimed is:

1. An optical information recording medium comprising a substrate, and a dielectric layer, a recording layer, a dielectric layer and a reflective layer which are laminated on said substrate in this order or a reflective layer, a dielectric layer, a recording layer and a dielectric layer which are laminated on said substrate in this order, wherein the state of said recording layer is reversibly changed between optically recognizable states by irradiation and said recording layer has a thickness of from 1 nm to 10 nm.

2. The optical information recording medium according to claim 1, wherein the thickness of said recording layer is from 3 nm to 8 nm.

3. The optical information recording medium according to claim 1, wherein the thickness of said recording layer is about 5 nm.

4. The optical information recording medium according to claim 1, wherein said recording layer comprises a phase-change material which is reversibly converted between a crystalline state and an amorphous state.

5. The optical information recording medium according to claim 1, wherein said recording layer comprises at least one alloy selected from the group consisting of GeSeTe, InSbTe, GaSb, InGaSb, GeSnTe and AgSbTe.

6. The optical information recording medium according to claim 5, wherein said recording layer comprises an alloy having a composition of a stoichiometric compound.

7. The optical information recording medium according to claim 1, wherein said recording layer comprises an alloy which comprises M, Te and Ge and has a composition of the formula: $M_xGe_yTe_z$ wherein $25 \leq x \leq 60$, $0 \leq y \leq 25$ and $37.5 \leq z \leq 60$, and wherein M represents Sn or Pb.

8. The optical information recording medium according to claim 7, wherein said alloy is $M_{50-a}Ge_aTe_{50}$ wherein $0 \leq a \leq 25$.

9. The optical information recording medium according to claim 1, wherein said recording layer comprises SnTe or PbTe.

10. The optical information recording medium according to claim 1, wherein said recording layer comprises an alloy containing Sn, Sb and Te and having a composition in which the deviation of the content of each element is within $\pm 5$ atomic percentages from the stoichiometric composition $SnSb_2Te_4$.

11. The optical information recording medium according to claim 1, wherein said recording layer comprises an alloy containing Sn, Sb, Te and Ge in which the concentration of Ge is smaller than that of Sn.

12. The optical information recording medium according to claim 11, wherein said recording layer comprises $Sn_{1-b}Ge_bSb_2Te_4$ wherein $0 < b < 0.5$.

13. The optical information recording medium according to claim 1, wherein said recording layer comprises an alloy containing Pb, Sb and Te and having a composition in which the deviation of the content of each element is within $\pm 5$ atomic percentages from the stoichiometric composition $Pb_2Sb_6Te_{11}$.

14. The optical information recording medium according to claim 1, wherein said recording layer comprises an alloy containing Pb, Pb, Te and Ge in which the concentration of Ge is smaller than that of Sb.

15. The optical information recording medium according to claim 14, wherein said recording layer comprises $Pb_2Sb_6Te_{11}$ wherein $0 < c < 1$.

* * * * *